(12) United States Patent
Peters

(10) Patent No.: US 7,650,381 B2
(45) Date of Patent: Jan. 19, 2010

(54) NETWORK BASED SYSTEM DESIGN OF CUSTOM PRODUCTS WITH LIVE AGENT SUPPORT

(75) Inventor: Charles A. Peters, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 904 days.

(21) Appl. No.: 10/476,423

(22) PCT Filed: Apr. 30, 2002

(86) PCT No.: PCT/US02/13768

§ 371 (c)(1), (2), (4) Date: May 27, 2004

(87) PCT Pub. No.: WO02/097705

PCT Pub. Date: Dec. 5, 2002

(65) Prior Publication Data

US 2005/0021599 A1    Jan. 27, 2005

Related U.S. Application Data

(63) Continuation-in-part of application No. 09/940,100, filed on Aug. 27, 2001, now abandoned.

(60) Provisional application No. 60/287,497, filed on Apr. 30, 2001.

(51) Int. Cl.
G06F 15/16 (2006.01)
(52) U.S. Cl. ..................... 709/205; 709/206
(58) Field of Classification Search ................ 709/204, 709/205, 206, 207
See application file for complete search history.

(56) References Cited

U.S. PATENT DOCUMENTS

| 6,070,149 A | 5/2000 | Tavor et al. |
| 6,614,783 B1* | 9/2003 | Sonesh et al. ............... 370/401 |
| 6,922,689 B2* | 7/2005 | Shtivelman ................. 709/203 |
| 7,299,202 B2* | 11/2007 | Swanson ..................... 709/205 |

(Continued)

OTHER PUBLICATIONS author unknown, Simplified Guide to the Java(tm) 2 Platform, Enterprise Edition, Sun Microsystems, Inc., Jan. 1999, pp. 1-22 retrieved from [http://java.sun.com/javaee/overview/whitepapers/] on Mar. 7, 2008.*

(Continued)

*Primary Examiner*—Patrice Winder
(74) *Attorney, Agent, or Firm*—Harness, Dickey & Pierce, P.L.C.

(57) ABSTRACT

A network based computer implemented system for designing products is disclosed. The system comprises a network server, such as an Internet web server (30) operable to manage interaction of the system with external computers, and a product design module (204) communicating with the network server. The product design module (204) is operable to generate product designs. The system further comprises a live agent support system (44) communicating with the network server. The live agent support system (44) is operable to provide live assistance to a customer of the system. An agent (312) of the live agent support system (44) and a customer of the system simultaneously view a same page of the design tool. The customer and agent (312) also mutually communicate while collaboratively manipulating the page.

38 Claims, 17 Drawing Sheets

U.S. PATENT DOCUMENTS

2001/0044749 A1  11/2001  Heisler
2002/0018076 A1   2/2002  Gianola
2002/0065877 A1*  5/2002  Kowtko et al. .............. 709/203
2002/0072821 A1*  6/2002  Baker ......................... 700/98
2002/0093538 A1   7/2002  Carlin

OTHER PUBLICATIONS

International Search Report of PCT/US02/13768, ISA/US, mailed Oct. 17, 2002 (Oct. 17, 2003).

* cited by examiner

NETWORK BASED SYSTEM DESIGN OF CUSTOM PRODUCTS WITH LIVE AGENT SUPPORT

BACKGROUND

The present invention relates generally to electronic commerce systems and electronic design systems. More particularly, the invention relates to a networked product configuration and design system having components to facilitate live agent support using network-based communications techniques. The invention will be described using an exemplary embodiment involving the design of custom storage closets. The invention may be utilized in numerous other applications as well.

Many companies have recognized the potential value of using the Internet to augment conventional marketing, sales, and support functions. In this regard, Internet web pages are now widely used to market products and the Internet shopping cart model is also widely used to handle the product sales function. Web-based customer support sites are also widely utilized, although typically such sites provide only answers to frequently asked questions or otherwise merely harvest email inquiries for a product support agent to answer by return email. These conventional marketing, sales, and support techniques work reasonably well for standardized, mass produced goods, such as computer software, books, pharmaceutical products, consumer electronic products, toys, and the like. These techniques work less well for products that are highly customized to a particular customer's needs. Heretofore, the intricate customer interaction needed to assist in the design of complex or highly customized systems has not been practical over the Internet.

The world wide web, and other information and communication facilities of the internet, have opened doors to a number of interesting business support applications. Initially, the internet served simply as a vehicle to disseminate information about a company's products and services, and to assist customers in selecting those products and services for purchase. Software systems, known as selection tools, evolved to support these simple selection functions.

However, more recently, sophisticated companies have begun using the internet to support complex products and services, and to assist customers in making complex purchasing and configuration decisions. Such functions go far beyond simple product selection. After items are selected, the relationships and interactions among those selected items are taken into account. Software systems known as configuration tools or "configurator" tools, have evolved to fulfill this purpose. In assessing relationships, configurator tools may employ both look-up and algorithmic processes.

By way of illustration, consider the product selection tool first. The typical product selection tool presents an on-screen catalog of products with an interactive interface through which the customer can add or subtract options. In shopping for a new computer, for example, the customer can make such option selections as adding or subtracting a modem, increasing or decreasing the memory and disk storage size, selecting a larger or smaller monitor, and the like.

In contrast, the configurator tool does considerably more. While it can be used to present on-screen information about products, services and selection options, the configurator tool also allows the user to alter parameters, combine components in user-defined ways, and to define the architecture and attributes of systems that may uniquely fit the user's needs.

For example, a configurator tool might be used to assist an engineer in designing the layout and components deployed in a petroleum refinery plant or an electric generating plant. Such applications would typically involve far more than simply selecting components. Complex physical, chemical, and electrical interactions also can be taken into account. Special attributes of individual components, such as their capacity, operating ratings, and physical characteristics also can be taken into account.

As the above example suggests, configurator tools can be quite complex. Often they may employ one or more expert systems or other artificial intelligence components to capture knowledge that is then presented to the user as needed. Unfortunately, there seems to be an inverse relationship between power and ease of use. The more powerful a configurator tool becomes, the more difficult it is to use.

As many web system designers have experienced, it is fairly easy to design an intuitive, self-directed tool when that tool must only access a shallow pool of knowledge. It becomes geometrically more difficult to retain the intuitive, self-directed properties as the knowledge pool deepens. Stated differently, as the body of knowledge encapsulated by the system grows, self-directed navigation through the system becomes increasingly more difficult.

The present invention tackles this problem with live agent technology. The expert system and other artificial intelligence components of the configurator tool are integrated with a live agent support system that places the user in communication with live agents (e.g. human assistants) as needed. While the user can navigate through and use the configurator tool alone, the user can also obtain on-the-spot assistance from a live agent simply by asking via on-screen selection. The live agent support system defines a common reference frame through which the user and agent communicate. While the common reference frame can take many forms, some of the presently preferred embodiments employ internet chat facilities for messaging and push technology to allow the agent to supply content to the user or to control what the user experiences at his or her web browser.

By solving the basic tool navigation problem, the invention makes complex configurator tools far easier to develop and use. In a typical implementation, the live agent works with the configurator tool every day, assisting users in solving ad hoc problems. Thus, while the agent may not necessarily be an expert in the underlying knowledge base for which the configurator tool was designed (e.g. instrumentation and control design, power system design, closet design), the agent does become an expert in using the tool. Thus when a user is blocked due to unfamiliarity with the tool, the live agent can step in to assist. This is a significant improvement that system users will readily appreciate.

However, from a business standpoint, the live agent support component of the invention offers an even more significant advantage. It places live agents in direct communication with customers, on the customers' own invitation. Direct marketing experts have long recognized the value of customer invitation. The potential customer who has given permission to be contacted directly represents a far better prospect than the one whose name simply appears on a purchased mailing list. The live agent support component of the invention thus places the live agent and potential customer (system user) in a permissive relationship that gives the live agent the opportunity to upsell, cross sell, and to establish a future relationship with that user as a customer.

SUMMARY OF INVENTION

In a first aspect, the present invention is a network based computer implemented system for designing products. The system comprises a network server operable to manage interaction of the system with external computers, and a product design module communicating with the network server. The product design module is operable to generate product designs. The system further comprises a live agent support system communicating with the network server. The live agent support system is operable to provide live assistant to a customer of the system.

In another aspect, the present invention is a method of encoding data operable to assist a customer of a web-based design tool. The method comprises receiving information transmitted over a computer network, wherein the information relates at least in part to a request for live assistance from the customer. The method further comprises viewing a page of the web-based design tool, wherein the page visually corresponds to a customer page of the web-based design tool. The customer page is further defined as a page of the web-based design tool that is a page currently in use by the customer. The method further comprises encoding data operable to assist the customer, wherein the data is embeddable into a propagating wave for transmission over the computer network to the customer. The encoding is based on the receiving and the viewing, wherein the receiving, the viewing, and the encoding are performed by a live agent.

In a further aspect, the present invention is a propagating wave for transmission over a computer network. The wave comprises a page of a web-based design tool, wherein the web-based design tool is operable to generate product designs, and wherein the page is operable to communicate customer use of said page to a live agent via the computer network. In a still further aspect, the present invention is a system designer comprising a configurator tool providing a range of relationships for correlating selections within a scope of a configuration and a common reference frame in communication with a configurator tool whereby a user of a configurator tool and a live agent simultaneously view at least one common page. In one respect, the configurator tool comprises an expert system and a live agent assists the user by helping the user to perform navigation of the expert system and/or use of the expert system. Live agent assistance is facilitated where the user and the live agent establish mutual communication. In one embodiment, the mutual communication occurs by means of Internet chat technology. In another respect, the live agent assists the user by means of modification of at least one of a selection, a relationship, a configuration, a configurator tool, the mutual communication, a common reference frame, and a common page. In a further aspect, the modification of the configuration may include expansion, limitation, and/or redefinition of a scope of the configuration. With regard to this further aspect, multiple configurator tools may be employed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION

Figure 1:
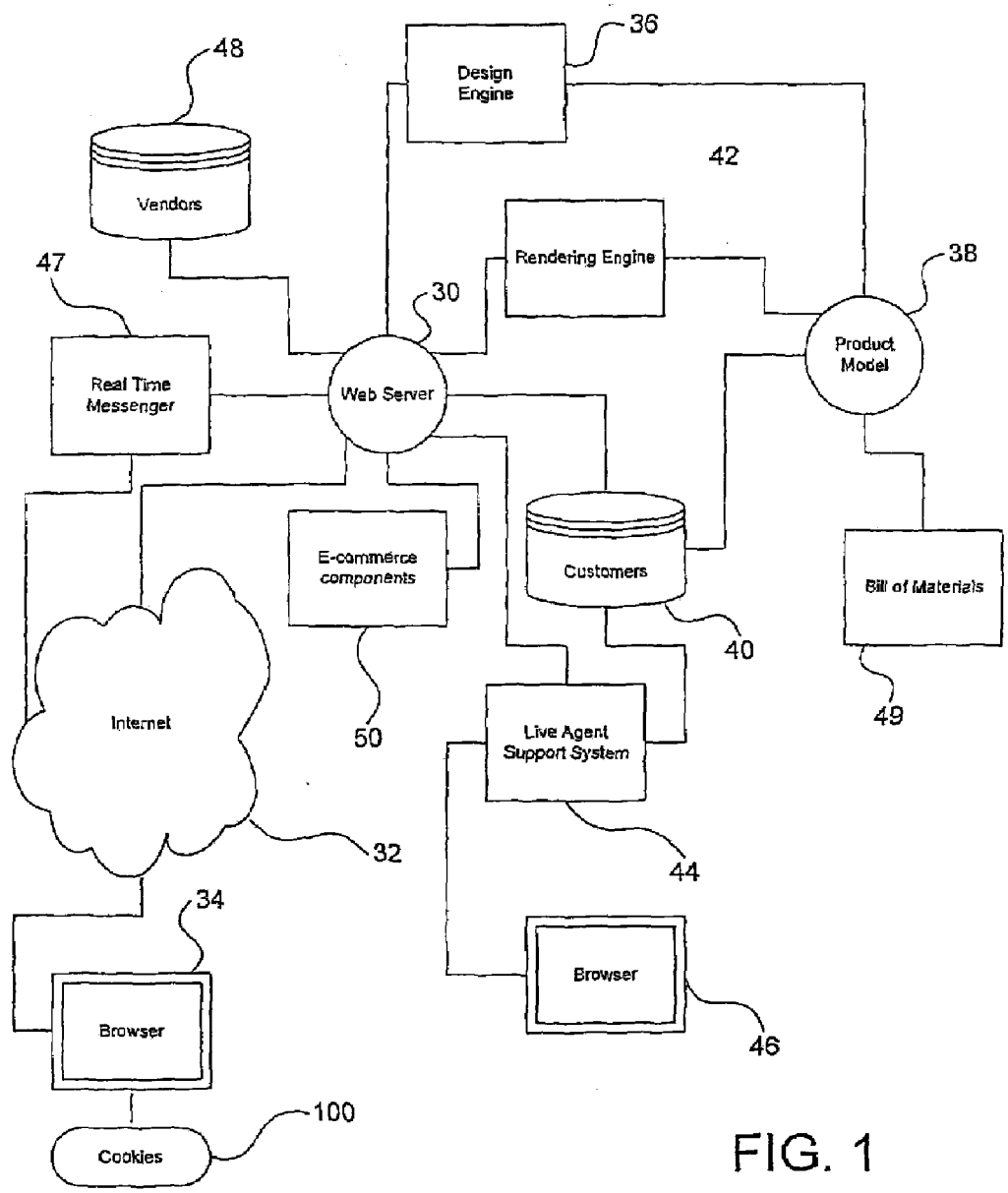
FIG. 1 is a data flow diagram of a first embodiment of the network based system.

With reference to FIG. 1, there is shown a computer implemented network based system for interactively designing products such as custom storage closets. The system includes a network server, such as an Internet web server 30 connected to a network such as the Internet 32. A user or customer interacts with the system through the Internet using a computer equipped with an Internet browser 34. Connected to the web server is a design engine 36 for managing the design of the custom product in response to user input. The current state of the product design is maintained in a product model 38 which is stored in a database 40. Preferably, this model is stored in relation to a set of customer specific data in a customer data record. A rendering engine 42 is connected to the web server and communicates with the customer database for constructing visual representations of the model. A live agent support system 44 is connected to the web server and the customer database. The live agent system may include a browser 46 to allow the live agent to determine information about a customer and to view designs developed by or for the customer.

To design a custom product, such as a custom storage closet, a user or customer establishes connection with the closet design system web server though the Internet, preferably using the personal computer and web browser. At an introductory web page, the customer chooses to initiate designing the closet. A live customer service agent introduces himself or herself, preferably using an Internet "chat" function, establishing two way live communication with the customer. A real time messenger component 47 is provided for this purpose. Alternatively, this communication can be through email, through audible messages, telephone contact or a combination of the above. For example, the customer could communicate with the agent through email, while the agent communicates with the customer through voice messages audible on the personal computer's speakers. The agent is preferably an expert trained in closet design and use of the closet design system.

In one mode of operation, the agent directs the interaction of the customer with the system. The agent asks a series of questions to focus the customer's interaction with the system. Typical questions may include the size and shape of the closet, locations of doors and windows, and other questions involving the requirements of the customer. Alternatively, the agent acquires some or all of this information from stored knowledge of the customer from previous transactions. The agent then creates an initial product model based on this information. The model is displayed on the web page and viewable by the customer. The agent then edits the model based on customer feedback. Alternatively, the customer edits the design using an interactive interface. The changes are visible to the customer on the web page. The above steps are repeated until the customer is satisfied with the closet design. After the model is initially designed, the agent requests additional information to help the customer select materials and other options, such as a storage arrangement for neckties. The model is modified, and shown to the customer on the web page.

In another mode of operation, at the introductory web page, the customer elects to design the closet himself, with the agent observing and providing guidance when requested. The customer provides basic information, such as the dimensions of the closet and location of doors and windows, from which an initial model is created. Alternatively, the customer can select from a list of pre-composed model templates. The initial model is then displayed on the web page. The customer adds objects, such as shelving, to the model using the interactive interface. The customer can add, remove, resize, or reposition the objects to achieve a satisfactory design. If the customer requests agent assistance, the agent requests appropriate information and modifies the model accordingly. Once the customer is satisfied with the initial design, he or she proceeds to a materials web page, where the bill of materials used to build the closet, along with other information necessary to finalize the design as specified. This information is incorporated into the model which is displayed to the user through the web page.

After the design of the closet is complete, the customer proceeds to a fabrication web page. The customer, at either at a web page prompt or live agent prompt, enters a zip code or other location information. Accessing vendor information stored in a vendors database 48, the system or agent identifies the location of a retail outlet proximately close to the location of the customer that can provide the materials necessary to build the custom closet. If desired the system can calculate a suggested retail price, which is displayed to the customer on the web page. In one mode of operation, the system provides the customer with a bill of materials 49, a cost, assembly directions, and a store location where the materials can be purchased. This information may be printed and taken to the store for item purchase. In another mode of operation, the customer initiates an electronic commerce (e-commerce) transaction to purchase the materials. E-commerce transaction components 50 are provided for this purpose. The purchased items can be shipped directly to the customer or made available at the retail outlet. Assembly directions are then provided by the system. According to a third mode of operation, the customer elects to have the custom closet materials installed. The customer initiates an e-commerce transaction to purchase the materials and arrange for installation.

Figure 2:
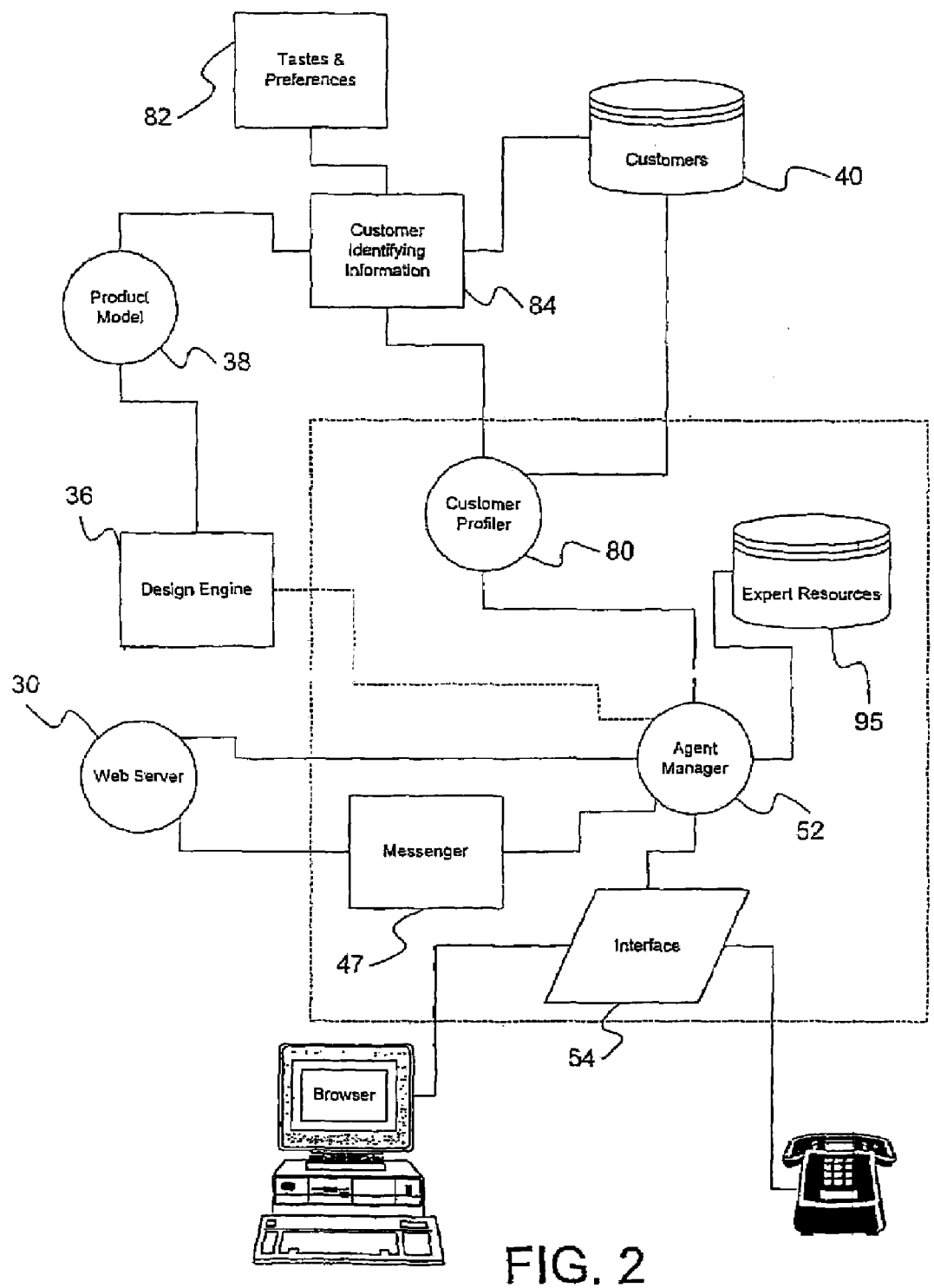
FIG. 2 is a data flow diagram illustrating one preferred embodiment of the live agent management system utilized by the invention.

In a presently preferred embodiment the customer initiates a product design session by making contact with the product design system's web server, preferably using an Internet browser. When the customer indicates that he or she wants to begin designing a custom product, such as the interior of a custom storage space or closet, the web server establishes contact with the live agent support system. The live agent begins viewing the session, preferably through a browser equipped computer connected to the live agent support system. With reference to FIG. 2, the live agent support system includes an agent manager 52 connected to the web server 30. The agent manager manages the interaction of the live agent and the custom closet design system.

With reference to FIG. 2, the agent manager communicates with the live agent's computer through an agent system interface 54. The agent manager also communicates with the web server through a real time messaging module 47. The customer is also able to communicate with the web server through a second real time messaging module 47 (see FIG. 1), preferably connected between the web server and the Internet. Alternatively, the customer employs the real time messaging module on his or her computer. The use of real time messaging modules allows the customer and the agent to type text messages which immediately appear on the computer screen of the other. This is similar to traditional Internet "chat" functionality. Alternatively, either the agent, the customer, or both, are equipped with a voice capturing device connected to the web server, which converts voice messages to a digital format, which is then transmitted to the other for playing on an audio speaker. This can include using a telephone. In order to support multiple customers simultaneously, a plurality of live agents must be employed at a given time. Thus, in a preferred embodiment, the agent manager monitors live agent availability and assigns agents to customers as they become available.

The system, preferably through the live agent, requests information from the customer. The customer provides the requested information either by communicating with the agent using real time messaging or by filling out an online information request form. This information includes basic personal information and custom closet requirements. The personal information is used to create or access a customer information record, which is then stored in a customer database. The custom closet requirements may include information such as the dimensions of the closet, the type and amount of items it will be required to store, and the location of doors or windows.

Figure 3:
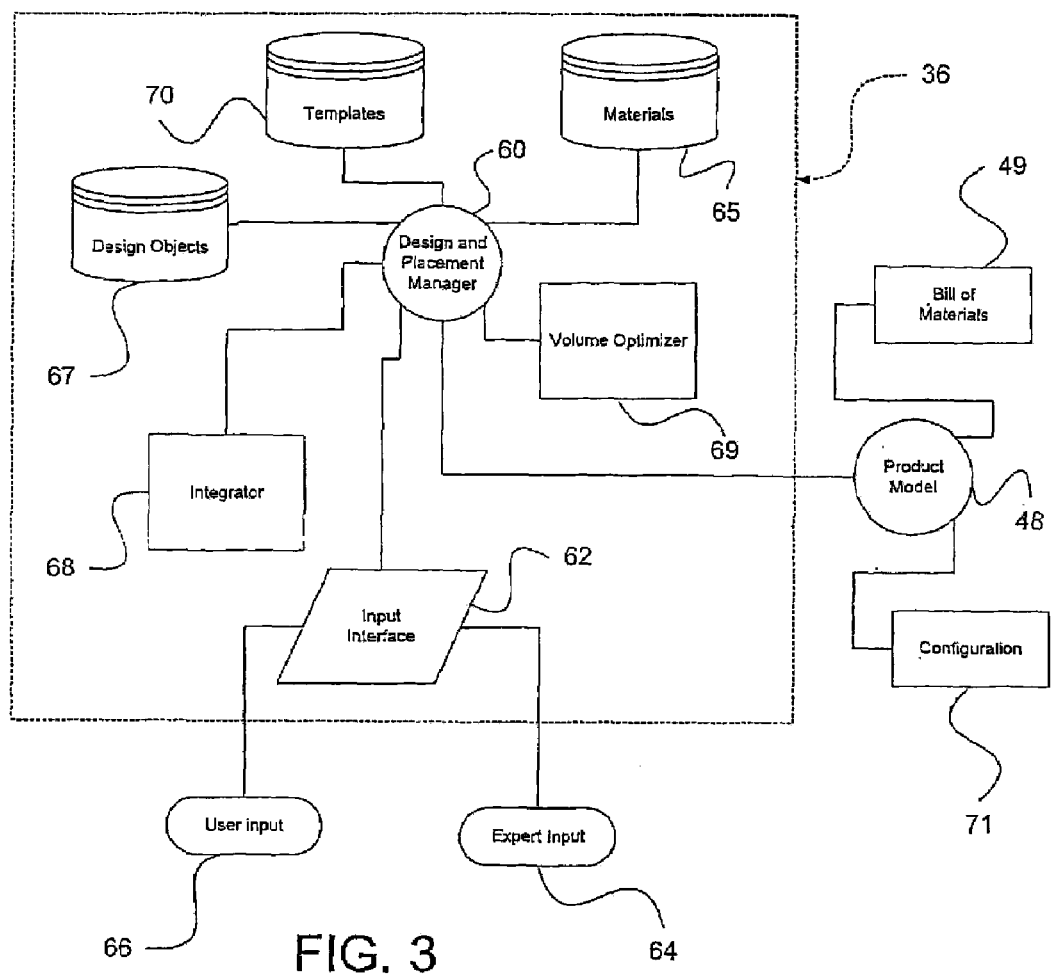
FIG. 3 is a data flow diagram illustrating one embodiment of the design engine utilized by the invention.

The customer closet requirements are transmitted to the product designer, which creates a product model 38. The product model is preferably stored in the customer database in relation to the customer information record. The customer information record also includes data elements describing the customer's profile 80, including the customer's tastes and preferences 82 and identifying information 84. With reference to FIG. 3, the design engine 36 includes a design and placement manager 60 connected to the web server through a product designer input interface 62. The agent manager is also connected to the design and placement manager through the product designer interface, preferably via the web server. The product designer interface coordinates the joint access to the product designer of the customer and the agent. Thus, the agent and the customer can view and augment the product model simultaneously through the respective expert input port 64 and user input port 66.

Once the customer provides the initial set of custom requirements, the system builds an initial product model. A product model includes a plurality of design objects, representing product components stored in design object database 67. Typical product components in a storage closet would include shelves and drawers, for example. The design objects are stored in a database connected to the design and placement manager. In one mode of operation, the design and placement manager selects an initial arrangement of design objects consistent with the customer's requirements. The arrangement includes the position of each design object relative to the other design objects and the defined closet space. Other materials used in the design are furnished from a materials database 65.

Preferably the design and placement manager employs a design object integrator 68 to manage the interaction of individual design objects. The integrator includes software modules that decide how each design object is placed such that it fits with other design objects such as those adjacent to it based on a set of criteria. For example, if the customer has chosen to have several storage baskets or drawers, the integrator decides how to arrange and connect them together. The criteria used by the integrator in this case may be a minimization of volume or parts, or to fit in a designated space. Thus, for a set of design object that could be connected in a plurality of ways, the integrator would choose the optimum combination based on the criteria. The criteria can be pre-defined or can be requested from the customer.

The product designer preferably includes a volume optimizer 69 connected to the design and placement manager to manage the overall volume utilization of the storage space. The volume optimizer arranges groups of design objects in such a manner as to maximize the useable volume in the storage closet while still satisfying the customer requirements. For example, the volume optimizer would assure that shelves and storage baskets would not be arranged so as to box off a portion of the storage area and make it inaccessible or unusable. The volume optimizer works in conjunction with the design object integrator. The design object integrator generates combinations of grouped design objects, from which the volume optimizer chooses an optimal solution. The design objects and their configuration are incorporated into the product model.

The product designer may also include a templates database 70 connected to the design and placement manager. The templates database includes a plurality of pre-composed product models, including design object and placement information. The design and placement manager, when creating an initial model, chooses a template that most closely matches the requirements provided by the customer. Alternatively, the live agent can choose the template based on the customer requirements. The design and placement manager, independently or under the control of the live agent, can then customize the template to further meet the customer requirements.

In another mode of operation, the customer or live agent define the parameters of the storage area and interactively place the design objects in a visual representation of the storage area. The representation of the storage area is visible on the web page in the browser. Preferably, the customer and agent have access to a software toolkit enabling them to interactively place, delete, move, and reposition individual design objects. When the customer or agent places or modifies a design object on the browser screen, the design and placement manager translates the instructions and augments the product model. The integrator manages the interaction between individual design objects such that they are properly placed consistent with the integration criteria, and modifies the product model accordingly. The specific aspects of the product model design are conveniently stored on the bill of materials 49 and configuration 71 data structures associated with the product model 38.

Once a product model has been created, the model is translated into a visual image to be displayed on computer screens through browsers by a rendering engine. When the customer or agent creates the initial product model or acknowledges a change to the model, the rendering engine creates a two-dimensional or three-dimensional visual representation of the closet based on the product model. The image is simultaneously displayed, through the web server, on the computers of the agent and the customer. When the customer or the agent is modifying the model interactively, as with using the toolkit, the rendering engine dynamically renders the visual images.

After an initial product model has been created, the customer modifies the product model using the interactive toolkit and browser. Alternately, he can request through the real time messenger that the agent make the desired modifications. The agent then uses the interactive toolkit to modify the product model. The rendering engine dynamically translates the model into visual images which are displayed through the browser.

With reference to FIG. 2, the live agent support system includes a customer profiler 80 connected to the agent manager. The customer profiler compiles and organizes the information in the customer record. This information can include the customer's personal information 84, tastes and preference 82 supplied by the customer, and the product model and requirements 38. This information can be gathered at the time requirement information is initially supplied to the live agent or system. It can also include information gathered from past interaction and transactions between the customer and the system. In this case, a cookie 100 (FIG. 1) may be transmitted by the custom product design system to the customer's computer and stored on that computer. The compiled and organized customer information is supplied to the live agent through the agent manager and displayed on the agent's computer screen in the browser window. In another mode of operation, the customer profiler compares the information on the customer to information compiled for other customers in the customer database. The customer profiler highlights similarities between the customer and other customers and makes inferences about the tastes and preferences of the customer based on those of other customers. With this information, the live agent can more accurately analyze the customer's requirements and make suggestions on how best to achieve a product meeting those requirements.

The live agent support system further includes an expert resource database 95 connected to the agent manager. The expert resources database includes solutions to anticipated problems, design suggestions, and other information that allows the live agent to more quickly and accurately help the customer.

When the customer is satisfied that the custom storage closet design is complete, the product designer generates implementation information for the design. The design and placement manager constructs a bill of materials for the design based on the design object and configuration information in the product model. Representations of the available materials are stored in a materials database connected to the design and placement manager. The design and placement manager selects the appropriate materials that are required to build a physical implementation of the product model, compiles a list of these materials, and augments the product model with this bill of materials. The customer can elect to view this bill of materials. It will then be displayed through the customer's web browser as a list of physical parts. The list of parts may include pictures of the parts. The information presented to the customer may also include the configuration information from the product model. The design and placement manager formats the configuration information such that it can be used to direct construction of the custom product. A final representation of the model can be generated by the rendering engine and transmitted to the customer.

In another preferred embodiment, design objects can be implemented using more than one material choice. For example, drawers may be implemented using wood, plastic, or wireframe. Criteria for selecting among these implementation options can be collected during the initial interaction between the customer and the system (or agent). Alternatively, the system or agent can request criteria after the model has been completed. The agent is aided by information from the customer profiler and the expert resources database. The design and placement manager uses this criteria to select from the materials in the materials database and generate a final bill of materials and configuration information. Preferably, the design object integrator is used to generate information on how the design objects as implemented by the specified materials are configured relative to one another. This information and the bill of materials are stored in the product model. A final representation of the model can be generated by the rendering engine and transmitted to the customer for viewing through the browser.

When the product model is complete with materials information, the system provides pricing and purchase information. A vendors database connected to the web server includes information on which vendors carry the materials in the product model. The system obtains the address or zip code of the customer, either by requesting it from the customer or from the customer data record. For example, the agent could ask for this information when the system is preparing to generate pricing and purchase information. A list of vendors ranked by distance from the customer is generated from the vendors database. In another mode of operation, the vendors database is periodically updated with material availability information directly from vendor inventory information.

Figure 4:
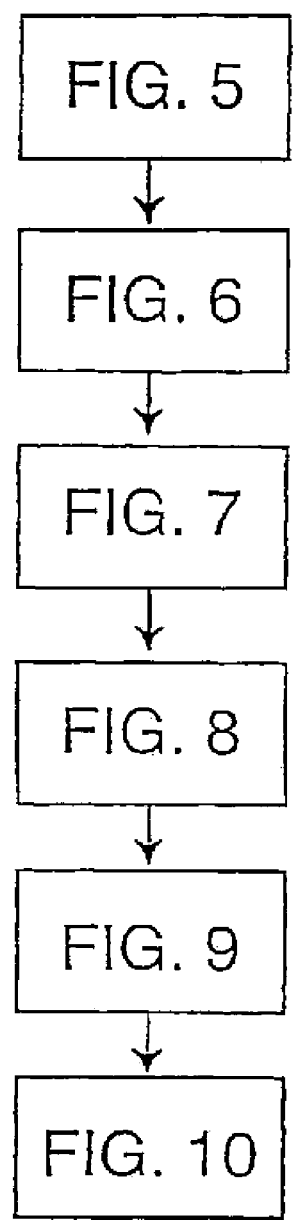
FIG. 4 is an exemplary site map of a web-based system in accordance with the invention, making reference to the following subsequent figures.
Figure 5:
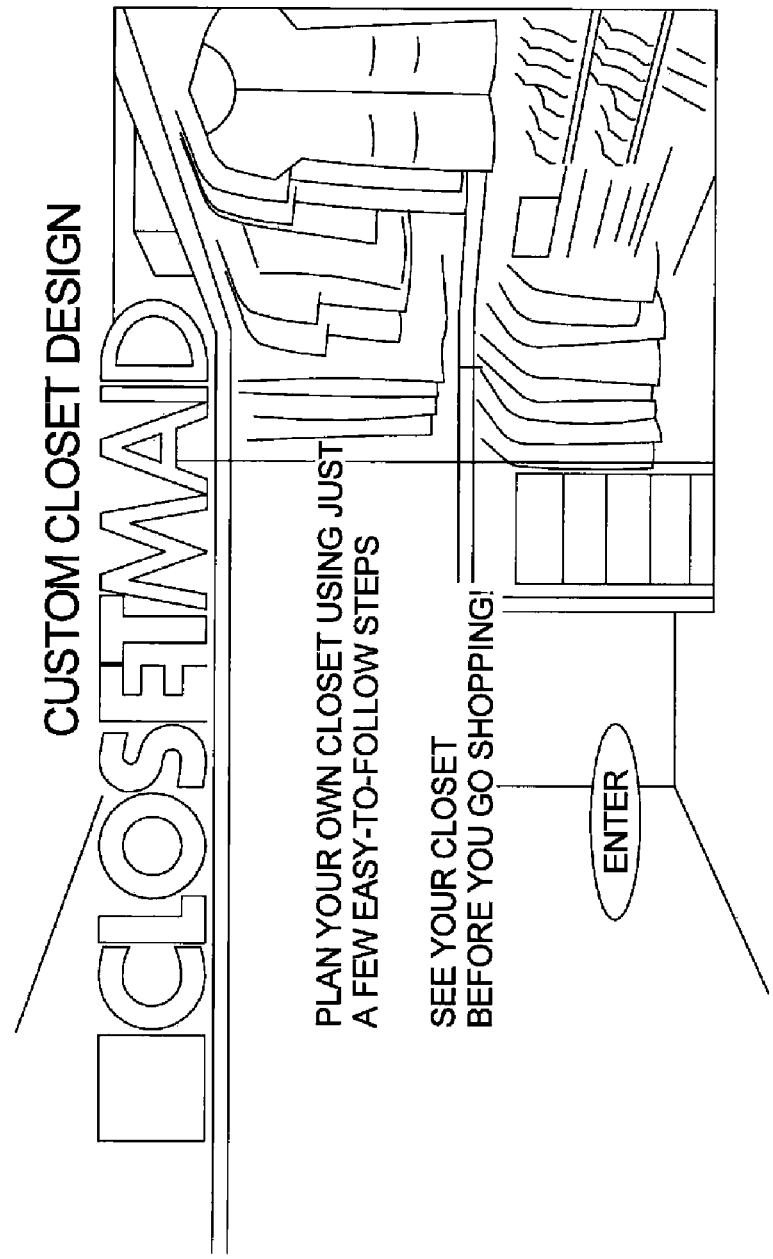
FIGS. 5-10 are exemplary web page screen shots illustration the invention in a custom storage closet application.
Figure 6:
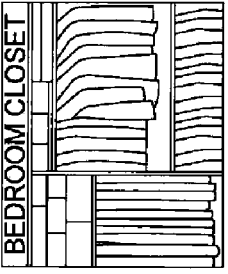
Figure 7:
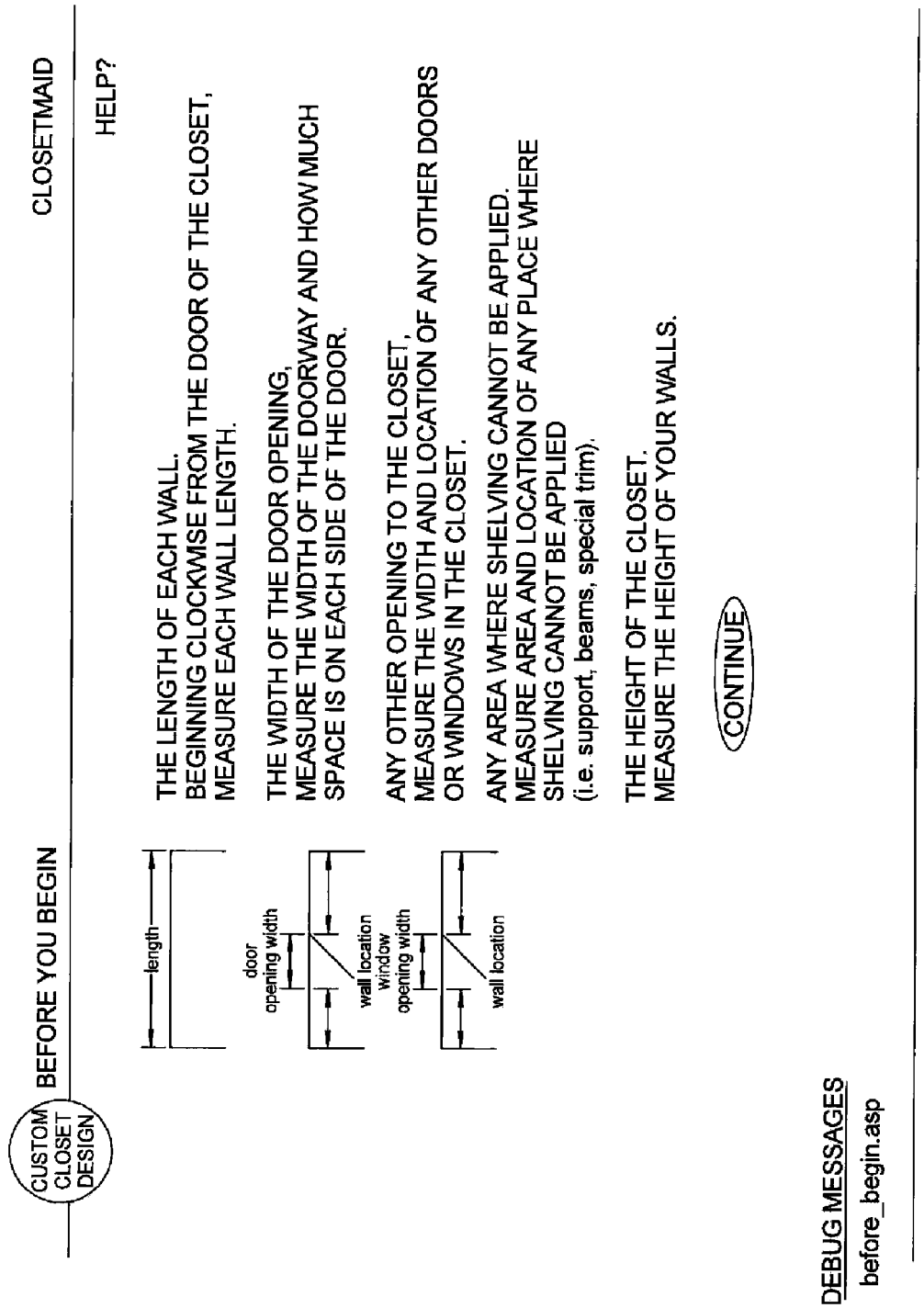
Figure 8:
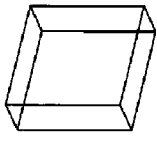
Figure 9:
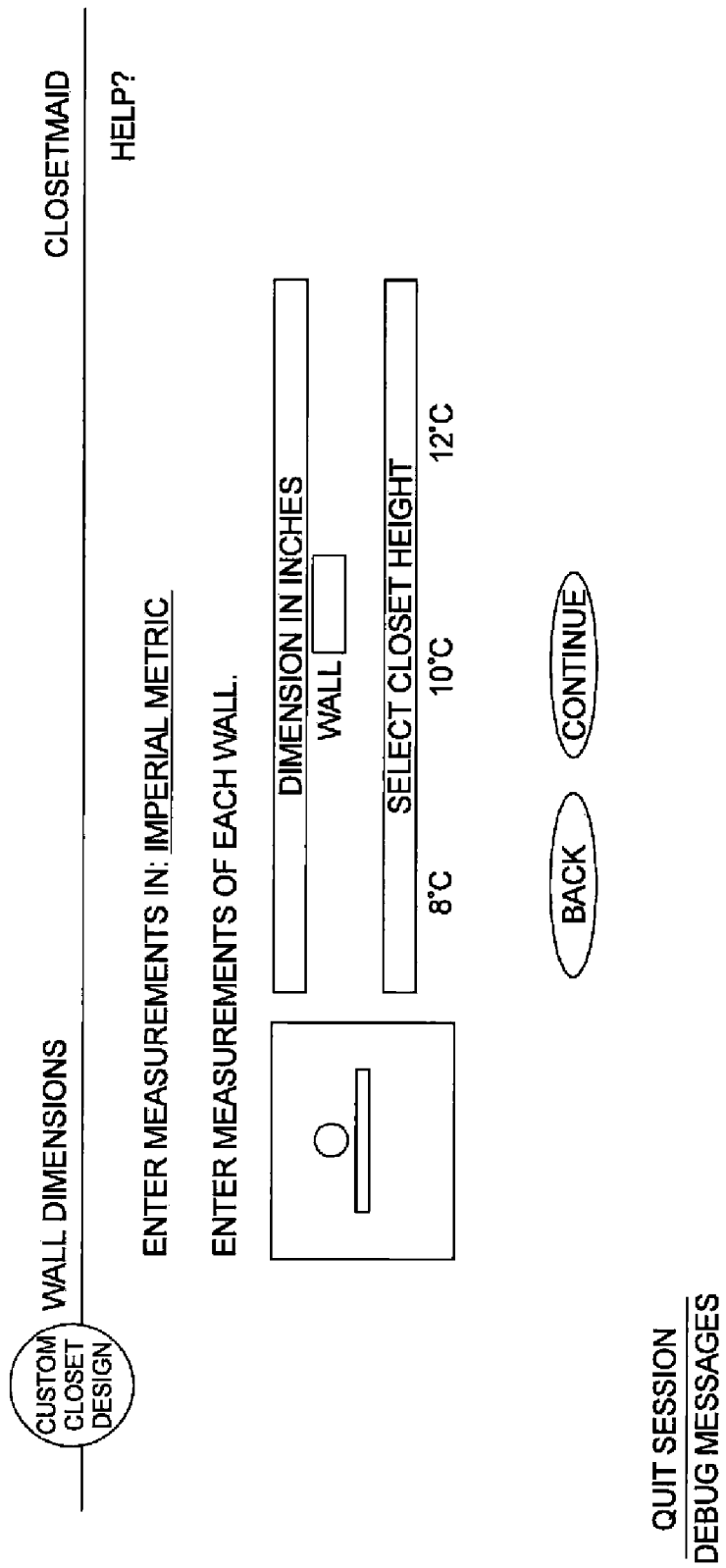
Figure 10:
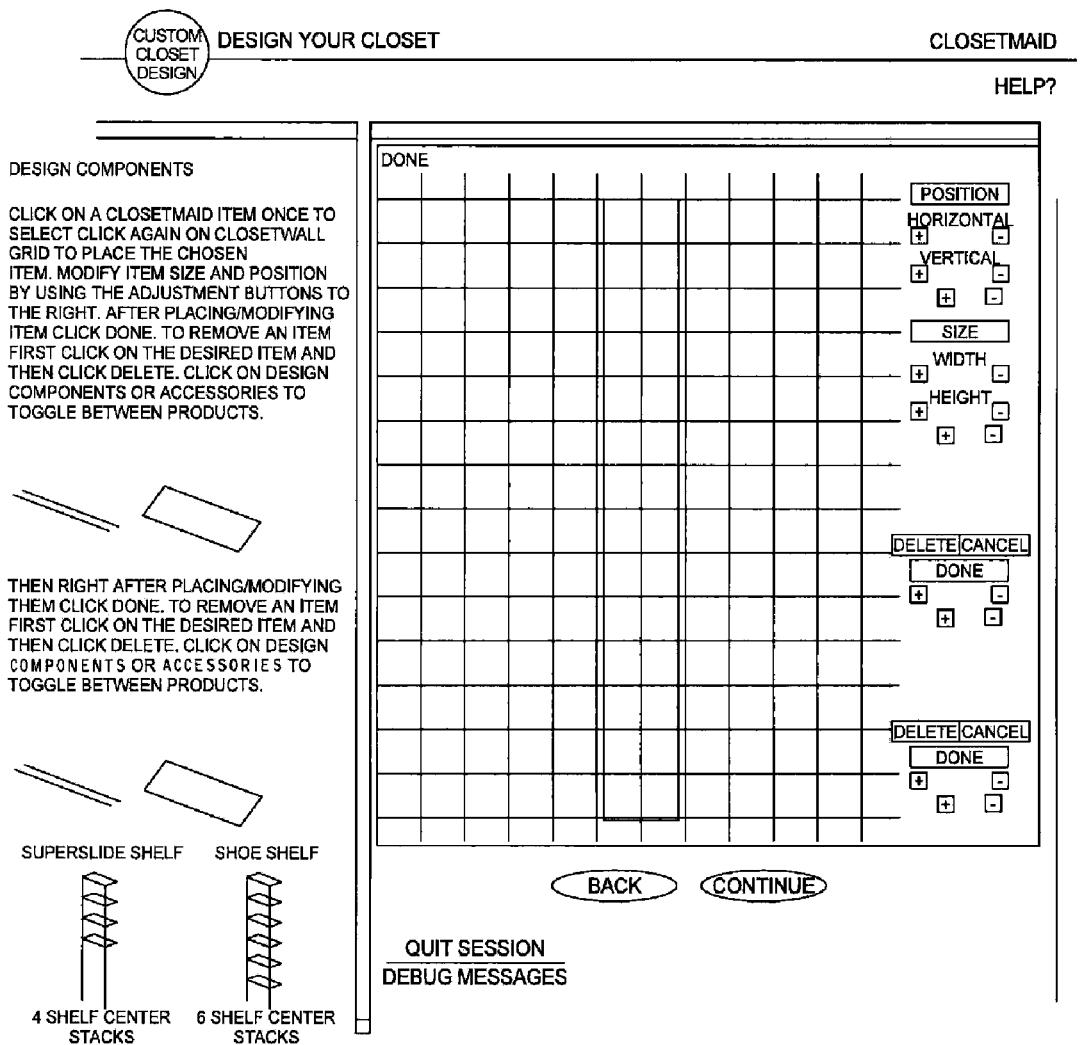

Although the system and method above were described in the context of designing custom storage closets, one skilled in the art will recognize that the invention is not so limited. The system and method described above can be used for designing an array of custom products. The following list should be considered illustrative, and not exhaustive, of the possible uses for the system and method of the present invention:

Electric motors
computer and network power supplies
manufacturing processes
tools
HVAC
Industrial Automation By way of further illustration, FIG. 4 and the subsequent figures illustrate an example of the invention in a custom storage closet design application. Specifically FIG. 4 is a site map, showing how the subsequent figures (web screen) are interrelated in the exemplary application. Thus a user of the application would be first presented with the introductory web screen illustrated in FIG. 5 and would then be presented with the web screen of FIG. 6 when the user interaction button is clicked. Navigation through the web site depends on which options the user selects as the individual screens are interacted with. Naturally, a working system may comprise numerous different permutations of the web screens, designed to meet the particular application being constructed.

Figure 11:
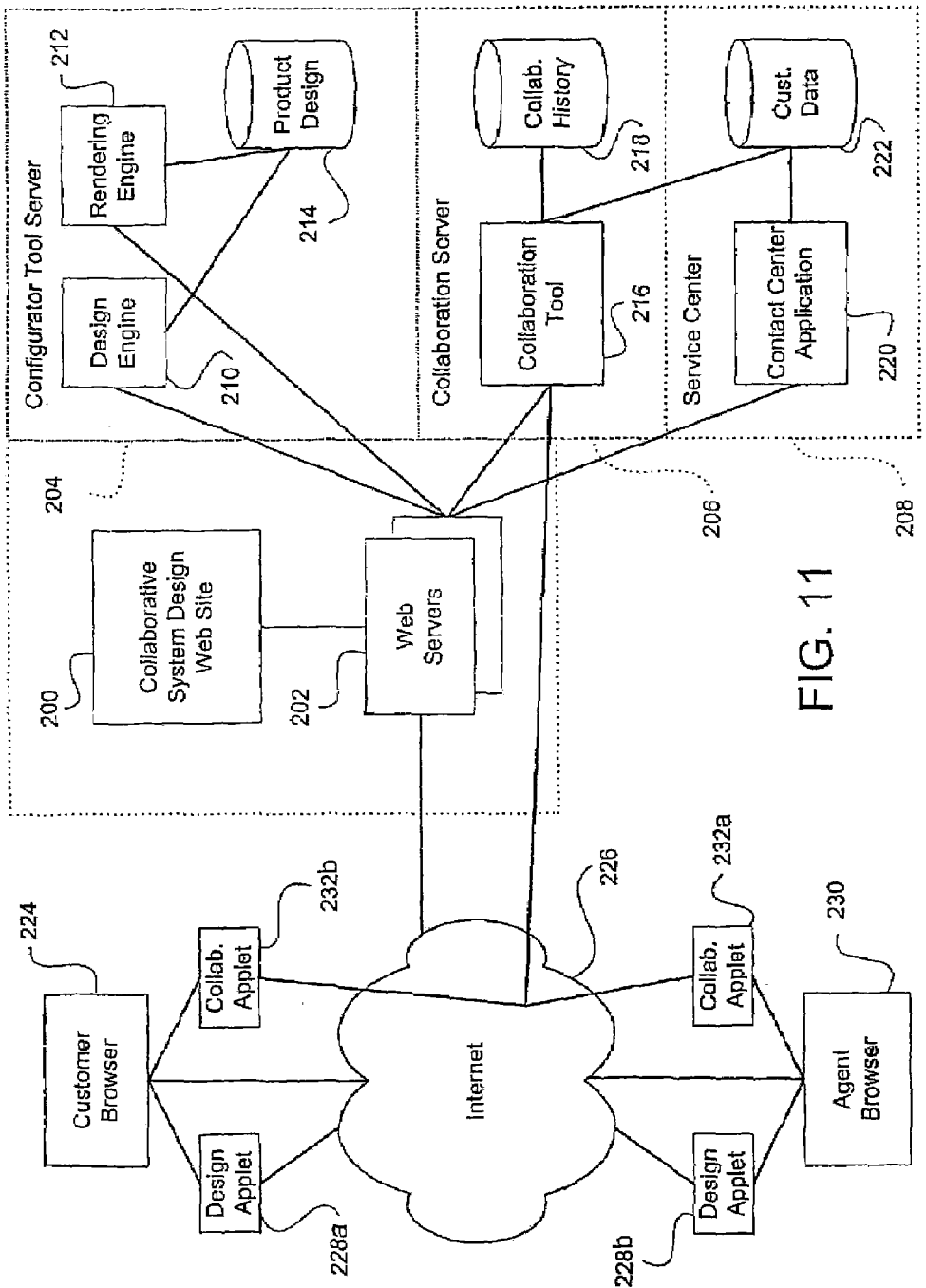
FIG. 11 is a block diagram of a presently preferred embodiment of the present invention.

Referring to FIG. 11, a block diagram of a presently preferred embodiment of the present invention includes a collaborative system design web site 200 implemented over a plurality of web servers 202. A product design module 204, collaboration module 206, and service module 208 of the plurality of web servers 202 correspond to servers running various applications and providing various types of data. The product design module 204, for instance, corresponds to a configurator tool server including a design engine 210, a rendering engine 212, and a product design database 214. Similarly, the collaboration module 206, corresponds to a collaboration server including a collaboration tool 216, and a collaboration history database 218. Further, service module 208 corresponds to a service center including a contact center application 220 and a customer database 222. The aforementioned modules interrelate to accomplish the present invention as further detailed below.

According to the system and method of the present invention, a customer may utilize customer browser 224 to access web site 200 via the internet 226 and download a design applet 228a from design engine 210. The design applet constitutes a propagating wave for transmission over a computer network, the wave comprising a plurality of pages. At any time that an agent assist button of web site 200 is available during a customer's use of design applet 228a, the customer may elect to seek live assistance by activating the agent assist, thereby initiating a request for a live agent. Presence or active status of an agent assist button is preferably dependent on agent availability, and requests go into a queue from which live agents select customers to receive assistance. Thus, requests may be directed to agents based on experience, special knowledge, responsibilities, and/or availability. A live agent then responds by using agent browser 230 to download a design applet 228b from design engine 210 and a collaboration applet 232a from collaboration tool 216. The agent further responds by causing the customer to download collaboration applet 232b, and thereby establish communication with the customer via internet chat technology and co-browsing capability.

Consistent with the present invention, collaboration applet 232a and collaboration applet 232b are operable to send and receive information to and from other applications and are further operable to communicate information to one another via the collaboration server. Design applet 228a and design applet 228b are further adapted to communicate with collaboration applet 232b and collaboration applet 232a, respectively, thus permitting communication of information between design applet 228a and design applet 228b. As a result, the live agent may automatically view an agent page of design applet 228b that is the same as a customer page of design applet 228a, where the customer page is the page currently being viewed by the customer. Further, previous manipulation by the customer of the page, such as selections, input of information into form fields, a current image of the design, etc., may be reflected automatically in the agent page. Still further, future manipulation of the customer page may be automatically reflected in the agent page and vice versa as the displays are refreshed with each valid change made to the designer. In other words, the customer and agent may collaborate by simultaneously manipulating their own pages, where those manipulations are automatically reflected in each other's pages. Various alternative embodiments for implementing the present invention also exist.

Two alternative embodiments that permit the type of collaboration detailed above include peer to peer connections and direct server access. For example, with implementation of a peer to peer connection between design applet 228a and design applet 228b, the need for an intermediate server may be eliminated. The peer to peer connection may be established, for example, by adapting design applet 228a and 228b to communicate directly with one another. The peer to peer connection may also be established with a configuration applet 232a and a configuration applet 232b that communicate directly with one another, absent the need for an intermediate server. Furthermore, with direct server access, the customer browser 224 and agent browser 230 may access the page directly on the configurator tool server, and thus view and manipulate an identical page. Still further, in an additional alternative embodiment, either the agent or the customer can control the other's mouse pointer cursor and active display. Such cursor control may be implemented by a suitable plug-in module. The module would be downloaded onto the computer to allow one to take control of the other's machine. A suitable software package for implementing such cursor control capability is available from eGain Communications Corporation, Sunnyvale, Calif. Cursor control can also be provided using PCAnywhere, available form Symantec Corporation, Cupertino, Calif. The customer may take control of the agent's machine or vice versa. In either case, the customer and agent may simultaneously enter information into forms and drag and drop pieces into a design. Thus, the ability for customers and agents to view a common page may be accommodated in a number of ways, but a preferred embodiment includes the ability for agents to push pages and images at the customer.

There exist several advantages associated with providing an ability for an agent to push pages and images at a customer. For example, the live agent may push new pages at the customer, thus guiding the customer through the design process. Further, the live agent may also access customer data via service module 208 and push pages and images to up-sell and cross-sell products based on the customer data. This customer data may reflect customer profile, customer behavior, customer history, customer demographics, and customer contact information. Further examples of customer data include previous chat transcripts, previously pushed files or URLs, previously collected customer satisfaction surveys, and any previous bills of material generated in the design process. Thus a session may pick up where it left off, with knowledge of results from previous sessions readily available to an agent. Hence, an agent's ability to service a customer is greatly enhanced, particularly where page pushing ability is combined with knowledge of customer data; but the service center also proves useful in other ways.

Consistent with the system and method of the present invention, the service center has additional value. For example, the service center further aids the agent in assisting the customer by housing a knowledge base of product and installation information for use by agents. This knowledge base serves as a central repository where agents will be able to look up answers to frequently asked questions, search for current promotions and offers, and find any other kind of information made available. Content may include text, HTML, image files, video, graphics, hyperlinks, and file attachments. Agents may thus find images and additional pages to push to a customer, as well as predefined scripts for use in chat that may be entered instead of manually typing in a message. Some, or all of this information may also be housed on the agent's desktop as well, with updates being made available through the central knowledge base. Thus, the agent's ability to assist the customer is further enhanced. As disclosed above, as a result of receiving information relating to a request for assistance from a customer, and viewing the same page as the customer, the live agent is able to encode information operable to assist the customer, wherein the information is embeddable into a propagating wave for transmission over the computer network. This ability is enhanced where the agent has access to customer data and the knowledge base disclosed above, thus permitting the agent to encode the data based on the customer data and the contents of the knowledge base. In addition to aiding agents in assisting customers, the service center has still further value.

Further value may be found in the service center in the form of added features. An added feature of the service center is an exit survey to capture customer impressions of web chat experience. Further, the service center manages inbound and outbound e-mail interactions with customers based on the customer data, where the customer data includes the last bill of materials generated with live assistance along with data from the collaboration history 218 generated during the session. Hence, the added value stemming from the live assistance is propagated throughout future correspondence with customers. Follow-up e-mails may be implemented to service the customers, where customer data includes necessary contact information collected via web registration processes throughout web site 200. The follow-up email system generates follow-up email for any customer that generates a bill of material, thus checking on successful purchase and installation of materials. Additional use of follow-up email is for customer satisfaction surveys, offers of additional assistance, and demonstration of an interest in customers' overall satisfaction. Thus, customer data can be collected and used in a number of ways, including collecting more customer data.

A further added feature of the present invention is a design for fee capability. According to the present invention, a customer may elect for professional design of a product, and live assistance may also assist in determining a customer's special needs.

Figure 12:
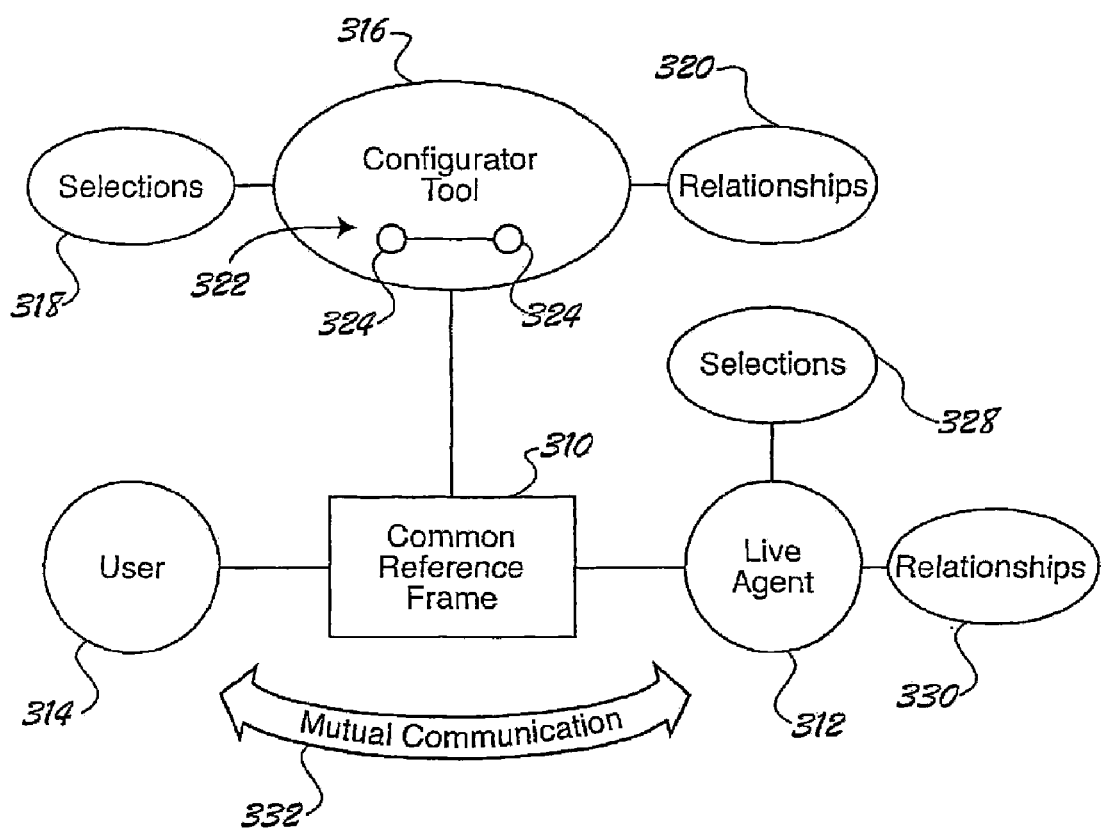
FIG. 12 is a relationship diagram for the Internet based system designer with live agent assist.

According to a further aspect of the present invention, an Internet based system designer with live agent assist focuses on helping a user navigate and use a configurator tool. Referring now to FIG. 12, a relationship diagram for the Internet based system design is shown. The crux of the system design is a common reference frame 310 which in a preferred embodiment is a user interface permitting a live agent 312 to simultaneous view the same web pages as a user 314. The common reference frame 310 reflects changes entered by the user 314 and allows the live agent 312 to push pages at the user 314. Thus, the live agent 312 assists the user 314 in the navigation and use of a configurator tool 316. As shown in FIG. 12, the configurator tool 316 has a domain of selections 318 and a range of relationships 320 for constructing a configuration 322. A configuration 322 is formed when individual selections 324 are correlated by a common relationship 326. Sample individual selections 324 within a domain of selections 318 for a particular configurator tool 316 might be components of a computer system all made by the same manufacturer. In such a case the range of relationships 320 for the particular configurator tool 316 might be particular component characteristics, requirements, and compatibility. In another example, a configurator tool 316 for designing a custom closet space might have a domain of selections 318 including closet features such as shelving units, shoe trees, tie racks, and storage compartments. For such a particular configurator tool 316 the range of relationships 320 might include space requirements, storage capability, and placement characteristics. In still a further example, a particular configurator tool 316 might focus on designing instrumentation and control layout. The domain of selections 318 for such a particular configurator tool 316 might include such components as intelligent field devices, standards and platforms, and integrated modular software. For such a particular configurator tool 316 the range of relationships 320 might include fluid flow requirements for a particular component as well as fluid flow characteristics of another component. A live agent 312 having a common reference frame 310 with a user 314 may push pages at the user 314 through the common reference frame 310 in an attempt to upsell and cross sell a particular component to a user 314. However, in order for a user 314 to benefit from the additional domain of selections 328 and additional domain of relationships the live agent 312 possesses through specialized knowledge, it is preferable for the live agent 312 and the user 314 to establish mutual communication 332. In a preferred embodiment the live agent 312 and the user 314 establish mutual communication 332 regarding a common reference frame 310 by means of a digital data link. It is foreseeable that the mutual communication 332 may be accomplished by various and other means such as Internet chat technology, an online instant messaging system, digital audio link, digital video link, or a telephone, to name a few. The digital data link, however, is preferred in that it allows the user to stay online and engaged in the process of configuration during the course of the mutual communication 332.

Figure 13:
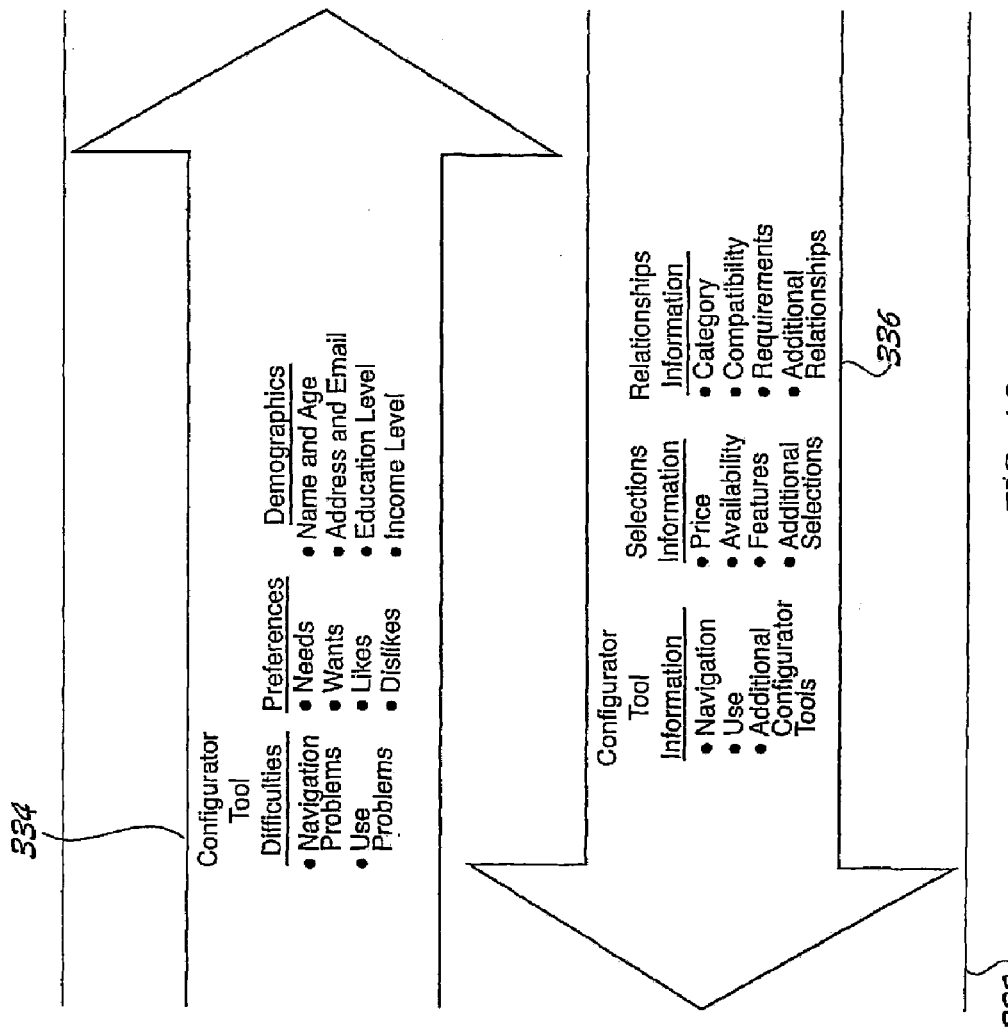
FIG. 13 is an information flow outline of the mutual communication between the user and the live agent.

Referring now to FIG. 13, an information flow outline of the mutual communication 332 is shown. In FIG. 13, user information 334 is communicated from the user 314 to the live agent 312. Examples of user information include configurator tool difficulties, preferences, and demographics. Examples of configurator tool difficulties include navigation problems and use problems. Examples of preferences include needs, wants, likes, and dislikes. Examples of demographics includes name and age, address and email, education level, and income level. In response to the user communication 334, FIG. 13 depicts agent communication 336 from the live agent 312 (FIG. 12) to the user 314 (FIG. 12). Examples of agent communication 336 includes configurator tool information, selections information, and relationships information. Examples of configurator tool information include navigation information, use information, and information concerning additional configurator tools. Examples of use information, such as configurator tool utilities, include testing of application limits and conformance to specification. Examples of selections information include price, availability, features, and additional selections. Examples of relationships information include category, compatibility, requirements, and additional relationships.

Figure 14:
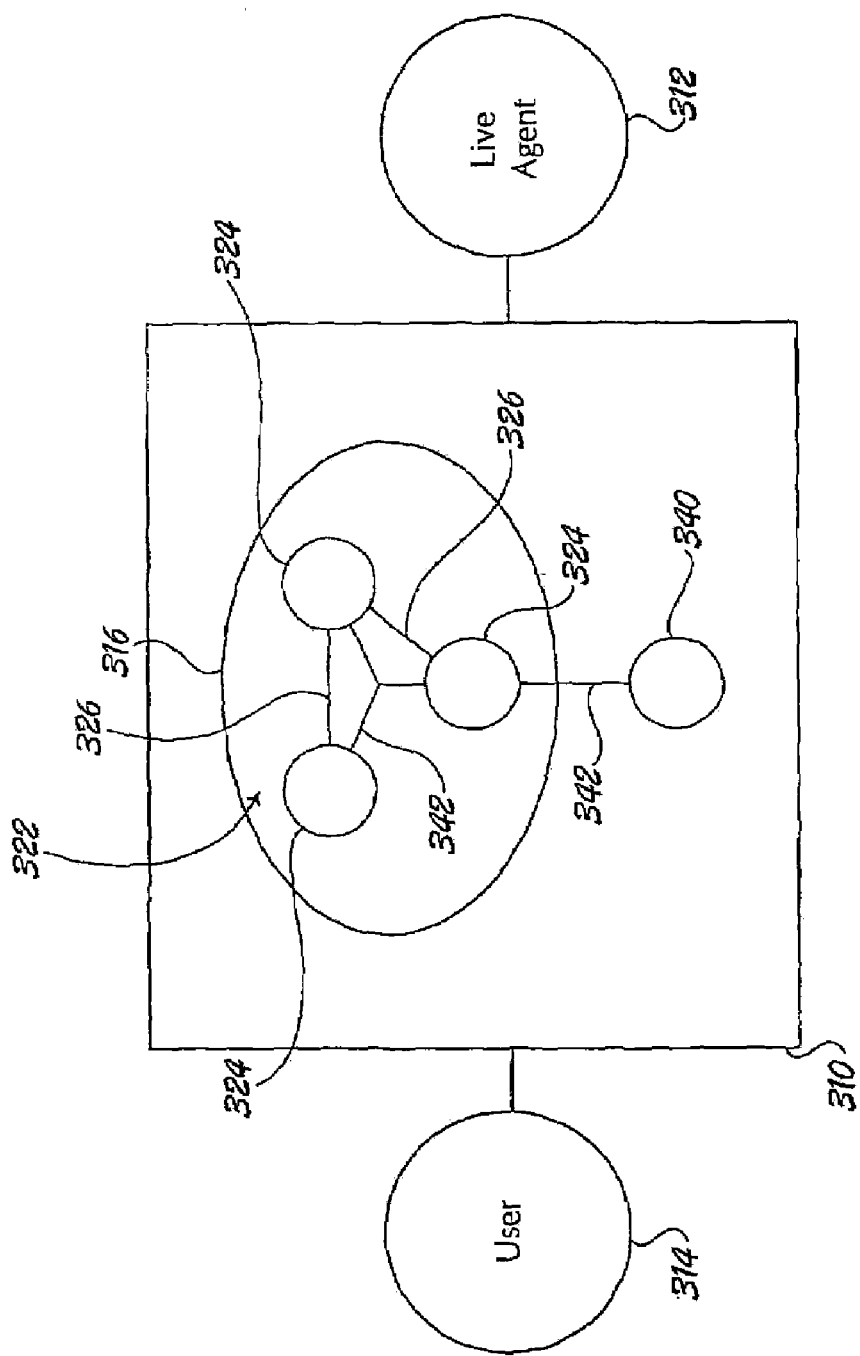
FIG. 14 is a relationship diagram depicting a live agent expanding the scope of a configurator tool by adding selections and relationships not within the scope of the configurator tool.

Referring now to FIG. 14, a configuration 322 formed by the configurator tool 316 is conceptually displayed from the perspective of the live agent 312 and the user 314 within the common reference frame 310. Individual selections 324 from the domain of selections 318 (FIG. 12) are displayed as correlated by common relationships 326 from within the range of relationships 320 (FIG. 12) possessed by the configurator tool 316. Together, the domain of selections 318 (FIG. 12) and the range of relationships 320 (FIG. 12) of the configurator tool 316 form a scope of the configurator tool 316. As shown in FIG. 14, the live agent 312 has modified the scope of the configurator tool 316 through supplementation with an additional individual selection 340 and additional common relationships 342. The additional individual selection 340 originates from the additional domain of selections 328 (FIG. 12), and similarly the additional common relationships 342 originate from the additional range of relationships 330 (FIG. 12). As an example, consider that a particular configurator tool 316 in which individual selections 324 might therefore be individual components of a personal computer system while the common relationships 326 might be information concerning compatibility and requirements of the individual components. The individual selections 324 might be personal computer system components for a particular manufacturer, and as a result, the user 314 might wish to configure these components with another component of another manufacturer that the user 314 already has in his or her possession. The particular component of another manufacturer, therefore, constitutes an additional individual selection 340 which is not within the scope of the configurator tool 316. The user 314 therefore, communicates a preference for the additional individual selection 340 via user communication 334 (FIG. 13) by means of the mutual communication 332 (FIG. 13). The live agent 312 may therefore supplement the configurator tool 316 with the additional individual selection 340 from within the additional domain of selections 328 (FIG. 12). Similarly, the live agent 312 may supplement the configurator tools 316 with additional common relationships 342 from within the additional range of relationships 330 (FIG. 12) such as compatibility and requirements for the additional individual selection 340. In this example, the personal computer system component of the other manufacturer may be compatible with the configuration 322 assembled by the configurator tool 316. As an additional example, the user 314 may communicate a preference via user communication 334 (FIG. 13) by means of mutual communication 332 (FIG. 13) to the live agent 312 regarding a need to remain within a particular budget. As a result, the live agent 312 may supplement the configurator tool 316 with additional common relationships 342 so as to achieve an optimal configuration 322 for the user 314 based on the need to remain within a particular budget.

Figure 15:
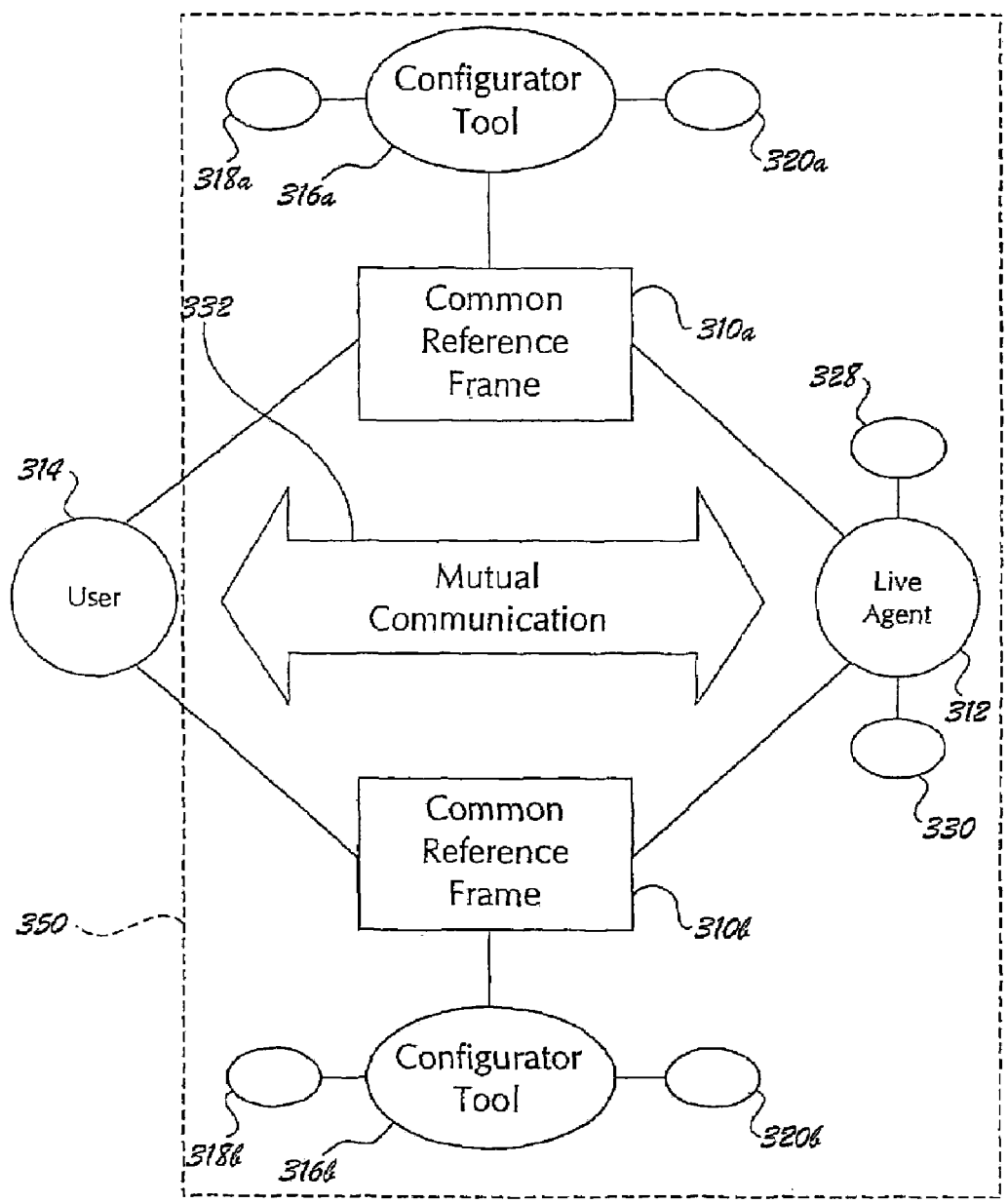
FIG. 15 is a relationship diagram depicting a live agent bridging the gap between configurator tools to create a multiple configurator tool system.

Referring now to FIG. 15, a depiction of a live agent 312 implementing a configurator tool system 350 is shown. In the configurator tool system 350 of FIG. 15, the live agent 312 uses a common reference frame 310a and a common reference frame 310b. Common reference frame 310a is in communication with configurator tool 316a and, similarly, common reference frame 310b is in communication with configurator tool 316b. Configurator tool 316a provides a domain of selections 318a and a range of relationships 320a. Similarly, configurator tool 316b provides a domain of selections 318b and a range of relationships 320b. Live agent 312 provides an additional domain of selections 328 and an additional range of relationships 330 by virtue of specialized knowledge. As preferred, the live agent 312 and the user 314 maintain mutual communication 332. It may be that common reference frame 310a and common reference frame 310b are identical, however, configurator tool 316a and configurator tool 316b should be understood as distinguishable. As one example, consider a configurator tool 316 for designing a closet. Also consider a configurator tool 316 for designing a kitchen. Also consider a configurator tool 316 for designing a living room. Also consider other configurator tools for designing various rooms within a home. The live agent 312 may assist the user 314 by bridging the gap between each configurator tool 316 to form a configurator tool system 350 for designing the interior of a home. While it is foreseeable that software tools may develop configurator tool systems 350 comprising more than one configurator tool 316, live agent assistance will further supplement such a configurator tool system 350 in a manner consistent with the present invention. A configurator tool 316 for deck design, for example, may be joined with the configurator tool system 350 for designing the interior of a home by means of the live agent to comprise a configurator tool system 350 for designing a home.

Figure 16:
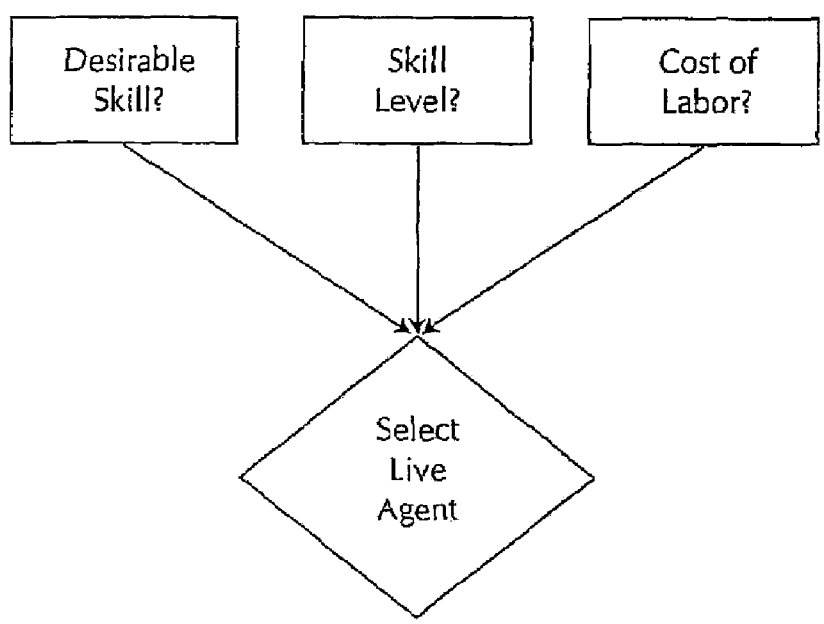
FIG. 16 is a flow chart depicting a method of selecting a live agent.

Referring now to FIG. 16, a flow chart depicting an agent selection method is shown. As depicted, it is necessary to determine at least one desirable skill required of the live agent, to determine an appropriate level of skill required of the live agent, and to evaluate the cost of labor for at least one live agent, and then select the live agent based, at least in part, on the cost of labor for a live agent with the appropriate level of skill regarding the desirable skill. As may be expected, some skills will be commonly desired for any live agent 312 (FIG. 12) chosen to provide assistance to an Internet based system designer. An example of such a skill would be the ability to read and write, while further examples of such skills include facility with a computer, interaction skills, and technical training regarding specifics of the applications.

Figure 17:
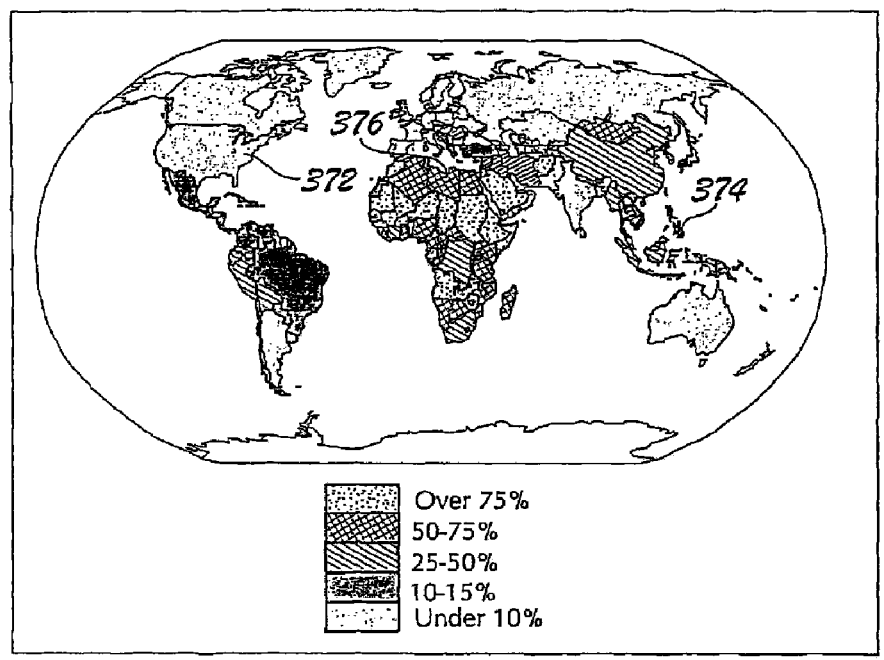
FIG. 17 is a world map depicting literacy by region.

Referring now to FIG. 17, a world map depicting literacy by region 370 is shown. A region of high literacy 372 is shown. In this case the region of high literacy 372 is the United States of America where the percentage of the adult population unable to read or write is under ten percent. Also, a region of relatively high literacy 374 is shown. In this case, the region of relatively high literacy 374 is the Philippines where the percentage of the adult population unable to read or write is ten to fifteen percent. Also shown is a region of relatively low literacy 376. In this case, the region of relatively low literacy 376 is Libya where a percentage of the adult population unable to read or write is fifty to seventy-five percent.

Figure 18:
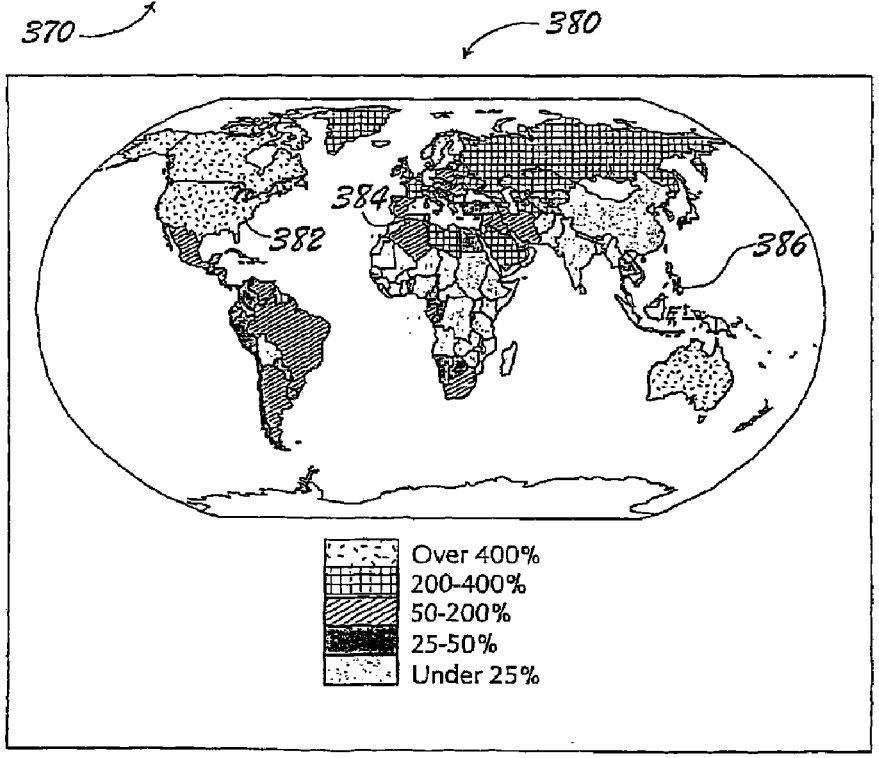
FIG. 18 is a world map depicting income level by region.

Referring now to FIG. 18, a world map depicting income level by region 380 is shown. As depicted, a region of high income level 382 is shown. In this case, a region of high income level 382 is the United States of America where the Gross National Product per capita exceeds four hundred percent. Also depicted in FIG. 20 is a region of moderately high income level 384. In this case the region of moderately high income level 384 is Libya where the Gross National Product per capita is two hundred to four hundred percent. Also shown is a region of low income level 386. In this case, the region of low income level 386 is the Philippines where the Gross National Product per capita is under twenty-five percent. As may be readily appreciated, selecting a live agent by the method depicted in FIG. 18 taking into account literacy as a desirable skill, literacy rate as indicative of skill level, and level of income as correlating to cost of labor, a selection of a live agent 312 (FIG. 12) in the Philippines is likely to result. Similarly, a live agent 312 (FIG. 12) of Lybia is not likely to result. In a preferred embodiment, fluency in the English language is also a desirable skill. High likelihood of fluency in the English language among people in the Philippines and especially in its capital city, Manila, further points to selection of a live agent in Manila, the Philippines by the method according to FIG. 18. Other skills to be considered may include the ability to type, particularly where the Internet based system designer with live agent assist establishes mutual communication 332 (FIG. 12) using a digital data link.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A network based computer implemented system for designing products, the system comprising:
   a network server operable to manage interaction of the system with external computers;
   a product design module communicating with said network server, said product design module operable to generate product designs via first and second product design applications that provide a same portion of information;
   a live agent support system communicating with said network server and implementing the first product design application, said live agent support system operable to provide live assistance to a customer that is generating one of the product designs using the second product design application; and
   a collaboration server that provides a first collaboration application that receives data from the first design application, and a second collaboration application that receives the data from the first collaboration application and sends the data to the customer to update the second design application while the customer is generating the one of the product designs.

2. The system of claim 1, the system further comprising a rendering engine communicating with said network server, said rendering engine operable to generate visual representations of the custom product designs for display on a computer monitor.

3. The system of claim 1, further comprising a customer database connected to said network server, said customer database operable to store customer data.

4. The system of claim 1, wherein said product design module includes a design tool operable to provide a page to the customer that includes the same portion of information, said page operable for use with designing a product.

5. The system of claim 4, wherein the customer and an agent of said live agent support system simultaneously view a same page of the design tool that includes the same portion of information.

6. The system of claim 5, wherein the customer and the agent simultaneously share an ability to manipulate the page and thereby collaboratively design the product.

7. The system of claim 5, wherein at least one of:
   a) the agent has an agent ability to substantially control a customer input device, wherein the customer input device corresponds at least in part to a customer pointer rendered on a customer active display, whereby the customer views the same page, and wherein the control corresponds at least in part to movement of the customer pointer; and
   b) the customer has a customer ability to substantially control an agent input device, wherein the agent input device corresponds at least in part to an agent pointer rendered on an agent active display, whereby the agent views the same page, and wherein the control corresponds at least in part to movement of the agent pointer.

8. The system of claim 1, wherein the customer and an agent of the live agent support system communicate via internet chat technology.

9. The system of claim 1, wherein the first and second product design applications correspond to first and second design applets, respectively, and wherein the product design module provides the first and second design applets to a client of the web server, the first and second design applets operable for use with designing a product and adapted to communicate with other applications.

10. The system of claim 9, wherein the customer and an agent of the live agent support system view design applets of a same type, and wherein input to one of the first and second design applets is communicated to another of the first and second design applets.

11. The system of claim 10, wherein input to the first design applet is received by the second design applet and reflected in the second design applet.

12. The system of claim 10, wherein the input is communicated via a peer to peer connection.

13. A network based computer implemented system for designing products, the system comprising:
   a network server operable to manage interaction of the system with external computers;

a product design module communicating with said network server, said product design module operable to generate product designs;

a live agent support system communicating with said network server, said live agent support system operable to provide live assistance to a customer, wherein the product design module provides a design applet to a client of the web server, the design applet operable for use with designing a product and adapted to communicate with other applications, wherein the customer and an agent of the live agent support system view design applets of a same type, and wherein input to one of the design applets is communicated to another of the design applets; and a collaboration tool connected to the network server for providing a collaboration applet to a client of the network server, the collaboration applet operable to receive information from a first application and relay said information to a second collaboration applet, said second collaboration applet operable to communicate the information to a second application, wherein each design applet is adapted to communicate with a collaboration applet, and wherein the input is communicated via use of collaboration applets.

14. A method of encoding data operable to assist a customer of a web-based design tool, the method comprising:

receiving information transmitted over a computer network, wherein the information relates at least in part to a request for live assistance from the customer;

viewing a page of the web-based design tool remote from the customer and using a first design application, wherein the page visually corresponds to a customer page of the web-based design tool, the customer page further defined as a page of the web-based design tool that is a page currently in use by the customer that views the page with a second design application;

encoding data operable to assist the customer based on a first collaboration applet that receives first data from the second design application that updates the page viewed by the live assistance, wherein the data is embeddable into a second collaboration applet for transmission over the computer network to the first design application, said encoding based on said receiving and said viewing, wherein said receiving, said reviewing, and said encoding are performed by a live agent.

15. The method of claim 14, the method further comprising manipulating the page, wherein said encoding is based on said manipulating, and wherein said manipulating is performed by the live agent.

16. The method of claim 14, the method further comprising at least one of:

a) selecting text for communication to the customer, wherein said selecting is performed by the live agent; and b) composing text for communication to the customer, wherein said composing is performed by the live agent, and wherein said encoding is based on at least one of:

a) said selecting; and b) said composing.

17. The method of claim 16, wherein the propagating wave corresponds to a wave of the type used with internet chat technology.

18. The method of claim 14, the method further comprising choosing at least one of:

a) a page for pushing to the customer, and b) an image for sending to a customer, and wherein said encoding is based on said choosing, and wherein said choosing is performed by the live agent.

19. The method of claim 14, the method further comprising accessing customer data, the customer data corresponding to at least one of a customer profile, customer behavior, customer history, customer demographics, and customer contact information, wherein said generating is based on said accessing, and wherein said accessing is performed by the live agent.

20. The method of claim 14, wherein the data is operable to substantially control a customer input device, wherein the customer input device corresponds at least in part to a customer pointer rendered on a customer active display, whereby the customer views the customer page, and wherein the control corresponds at least in part to movement of the customer pointer.

21. The method of claim 14, wherein the information further relates to substantial control by the customer of an agent input device, wherein the agent input device corresponds at least in part to an agent pointer rendered on an agent active display, whereby the live agent views the page, and wherein the control corresponds at least in part to movement of the agent pointer.

22. A computer medium that executes a computer program, wherein the computer program implements a page of a web-based design tool that implements the method of claim 14.

23. A method of providing live agent assistance for an internet based system designer, the method comprising:

providing a configurator tool to a user permitting the user to assemble a configuration of selections via a first design program, wherein the configuration includes at least two selections and a relationship correlating the selection;

establishing a common reference frame between the user and a live agent that is using a second design program, wherein the user and the live agent simultaneously view at least one common page using the first and second design programs, respectively, wherein the live agent assists the user;

providing a first collaboration applet that receives data from the common page viewed by the user via the first design program; and providing a second collaboration applet that receives the data from the first collaboration applet and sends the data to the second design program used by the live assistance to update the common page viewed by the live agent assistance.

24. The method of claim 23 wherein the configurator tool comprises an expert system and the live agent assists the user by helping the user to perform at least one of navigation of the expert system and use of the expert system.

25. The method of claim 23, further comprising the step of establishing mutual communication between the user and the live agent.

26. The method of claim 25, wherein the user and the live agent simultaneously view the common page while maintaining mutual communication.

27. The method of claim 25, wherein the mutual communication occurs by at least one of telephone, digital video link, digital audio link, online instant messaging system, and internet chat technology.

28. The method of claim 23, wherein the selections are preselected for configuration.

29. The method of claim 23, wherein the relationship involves at least in part at least one algorithmic function.

30. The method of claim 23, wherein the live agent assists the user in modification of at least one of a selection, a relationship, the configuration, the configurator tool, the mutual communication, the common reference frame, and the common page.

31. The method of claim 30, wherein the modification of the configuration includes at least one of expansion, limitation, and redefinition of a scope of the configuration.

32. The system designer of claim 31, wherein the expansion of a scope of the configuration includes live agent assistance with multiple configurator tools.

33. The method of claim 23, wherein the common reference frame permits the live agent to view a user interface that looks the same as the user interface of the user.

34. The method of claim 23, wherein the live agent is chosen by an agent selection method comprising:
    determining at least one desirable skill required of a live agent;
    determining an appropriate level of skill required of a live agent;
    evaluating the cost of labor for at least one live agent; and
    selecting a live agent based at least in part on the cost of labor for a live agent with the appropriate level of skill regarding the desirable skill.

35. A network based computer implemented system for designing products, the system comprising:
    a network server that manages interaction between the system and external computers;
    a product design module that communicates with the network server and that generates product designs via first and second design programs;
    a live agent support system that communicates with the network server and that provides live assistance to a client, wherein the client views the first design program, and an agent of the live agent support system views the second design program; and
    a collaboration tool that provides a first collaboration program that receives data from the first design program, and a second collaboration program that receives the data from the first collaboration program and sends the data to the live agent support system to update the second design program.

36. The network based computer implemented system of claim 35, wherein the first and second design programs and the first and second collaboration programs each include applets.

37. The network based computer implemented system of claim 36, wherein the first and second design programs provide a same portion of information.

38. The network based computer implemented system of claim 36, wherein the first and second design programs communicate with network applications.

* * * * *

UNITED STATES PATENT AND TRADEMARK OFFICE
CERTIFICATE OF CORRECTION

| | | |
|---|---|---|
| PATENT NO. | : 7,650,381 B2 | Page 1 of 1 |
| APPLICATION NO. | : 10/476423 | |
| DATED | : January 19, 2010 | |
| INVENTOR(S) | : Charles A. Peters | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1149 days.

Signed and Sealed this

Twenty-third Day of November, 2010

David J. Kappos
*Director of the United States Patent and Trademark Office*